(12) United States Patent
Tomonaga

(10) Patent No.: US 10,574,112 B2
(45) Date of Patent: Feb. 25, 2020

(54) STATOR FOR ROTARY ELECTRIC MACHINE HAVING INSULATORS ENGAGED TO STATOR TEETH

(71) Applicant: TOYOTA JIDOSHA KABUSHIKI KAISHA, Toyota-shi, Aichi-ken (JP)

(72) Inventor: Takeshi Tomonaga, Toyota (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 197 days.

(21) Appl. No.: 15/522,382

(22) PCT Filed: Sep. 10, 2015

(86) PCT No.: PCT/JP2015/004624
§ 371 (c)(1),
(2) Date: Apr. 27, 2017

(87) PCT Pub. No.: WO2016/067506
PCT Pub. Date: May 6, 2016

(65) Prior Publication Data
US 2017/0324295 A1    Nov. 9, 2017

(30) Foreign Application Priority Data

Oct. 27, 2014    (JP) .................................. 2014-218669

(51) Int. Cl.
*H02K 3/32*    (2006.01)
*H02K 3/52*    (2006.01)
(Continued)

(52) U.S. Cl.
CPC ............... *H02K 3/325* (2013.01); *H02K 1/02* (2013.01); *H02K 3/345* (2013.01); *H02K 3/522* (2013.01); *H02K 15/022* (2013.01)

(58) Field of Classification Search
CPC ............ H02K 1/02; H02K 1/04; H02K 3/325; H02K 3/34; H02K 3/345; H02K 3/52; H02K 3/522; H02K 15/022; H02K 15/10
(Continued)

(56) References Cited

U.S. PATENT DOCUMENTS 5,763,978 A * 6/1998 Uchida .................. H02K 3/325
                                                         310/214
7,262,534 B2 * 8/2007 Baba ...................... H02K 1/146
                                                         310/153
(Continued)

FOREIGN PATENT DOCUMENTS

EP      2 009 769 A2    12/2008
JP      3791492 B2      6/2006

*Primary Examiner* — Jermele M Hollington
*Assistant Examiner* — Rashad H Johnson
(74) *Attorney, Agent, or Firm* — Sughrue Mion, PLLC

(57) ABSTRACT

A stator for a rotary electric machine includes a stator core including a stack of a plurality of steel sheets 36; a stator coil wound around teeth of the stator core; and a plurality of insulators interposed between the stator core and the stator coil. Each of the insulators has at least one engagement tab projecting toward a side surface of a tooth. Each of the steel sheets 36 has a plurality of tooth portions 40 that form the teeth when the steel sheets 36 are stacked. Each of some of the plurality of tooth portions 40 has a notch 42 formed on a side surface of the tooth portion 40, the notches 42 forming an engagement recess in which the engagement tab is hooked when the steel sheets 36 are stacked. The stator core is formed by rotating and stacking the plurality of steel sheets 36.

7 Claims, 10 Drawing Sheets

(51) Int. Cl.
*H02K 15/02* (2006.01)
*H02K 3/34* (2006.01)
*H02K 1/02* (2006.01)

(58) Field of Classification Search
USPC .................. 310/208, 215, 216.04, 216.044
See application file for complete search history.

(56) References Cited

U.S. PATENT DOCUMENTS

| | | | | |
|---|---|---|---|---|
| 8,786,158 | B2* | 7/2014 | Neuenschwander .. | H02K 1/148 310/216.043 |
| 9,331,530 | B2* | 5/2016 | Jang ...................... | H02K 1/146 |
| 2004/0124733 | A1* | 7/2004 | Yamamoto ............. | B29C 70/72 310/216.044 |
| 2005/0264111 | A1 | 12/2005 | Tanaka et al. | |
| 2006/0022549 | A1* | 2/2006 | Otsuji ................... | H02K 3/325 310/216.001 |
| 2009/0026873 | A1* | 1/2009 | Matsuo ................. | H02K 1/148 310/216.009 |
| 2009/0127969 | A1* | 5/2009 | Okuyama ............. | H02K 3/522 310/215 |
| 2012/0062051 | A1* | 3/2012 | Ueno .................... | H02K 1/148 310/43 |
| 2013/0113332 | A1* | 5/2013 | Saito ...................... | H02K 3/522 310/214 |
| 2013/0320800 | A1* | 12/2013 | Senoo ................... | H02K 3/522 310/214 |
| 2014/0091667 | A1* | 4/2014 | Uchitani ............... | H02K 3/522 310/198 |
| 2014/0175935 | A1* | 6/2014 | Tsuchiya ............... | H02K 3/522 310/214 |
| 2015/0061452 | A1* | 3/2015 | Nakatake .............. | H02K 3/325 310/214 |
| 2015/0084476 | A1* | 3/2015 | Jang ...................... | H02K 1/146 310/216.016 |
| 2015/0340914 | A1* | 11/2015 | Asakura ................ | H02K 21/16 310/208 |
| 2016/0211733 | A1* | 7/2016 | Hattori .................. | H02K 15/10 |
| 2016/0336819 | A1* | 11/2016 | Haruno ................. | H02K 3/522 |
| 2016/0336828 | A1* | 11/2016 | Miyamoto ............. | H02K 3/18 |
| 2017/0133901 | A1* | 5/2017 | Burch ................... | H02K 1/16 |
| 2017/0141653 | A1* | 5/2017 | Okazaki ................ | H02K 3/34 |
| 2017/0288480 | A1* | 10/2017 | Murakami ............ | H02K 1/148 |
| 2017/0324295 | A1* | 11/2017 | Tomonaga ............ | H02K 3/522 |
| 2018/0226867 | A1* | 8/2018 | Hattori .................. | H02K 15/12 |
| 2018/0233997 | A1* | 8/2018 | Takahashi ............ | H02K 15/024 |
| 2018/0248419 | A1* | 8/2018 | Nigo .................... | H02K 3/34 |
| 2018/0269731 | A1* | 9/2018 | Ogino ................... | H02K 1/17 |

* cited by examiner

[Fig. 1]
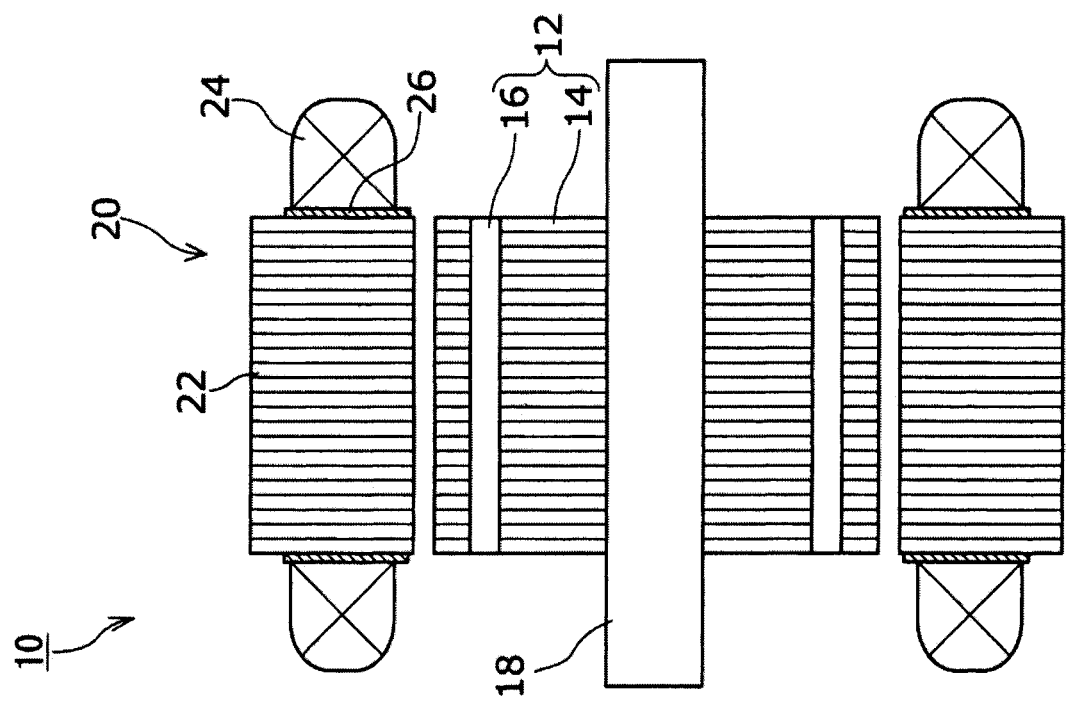

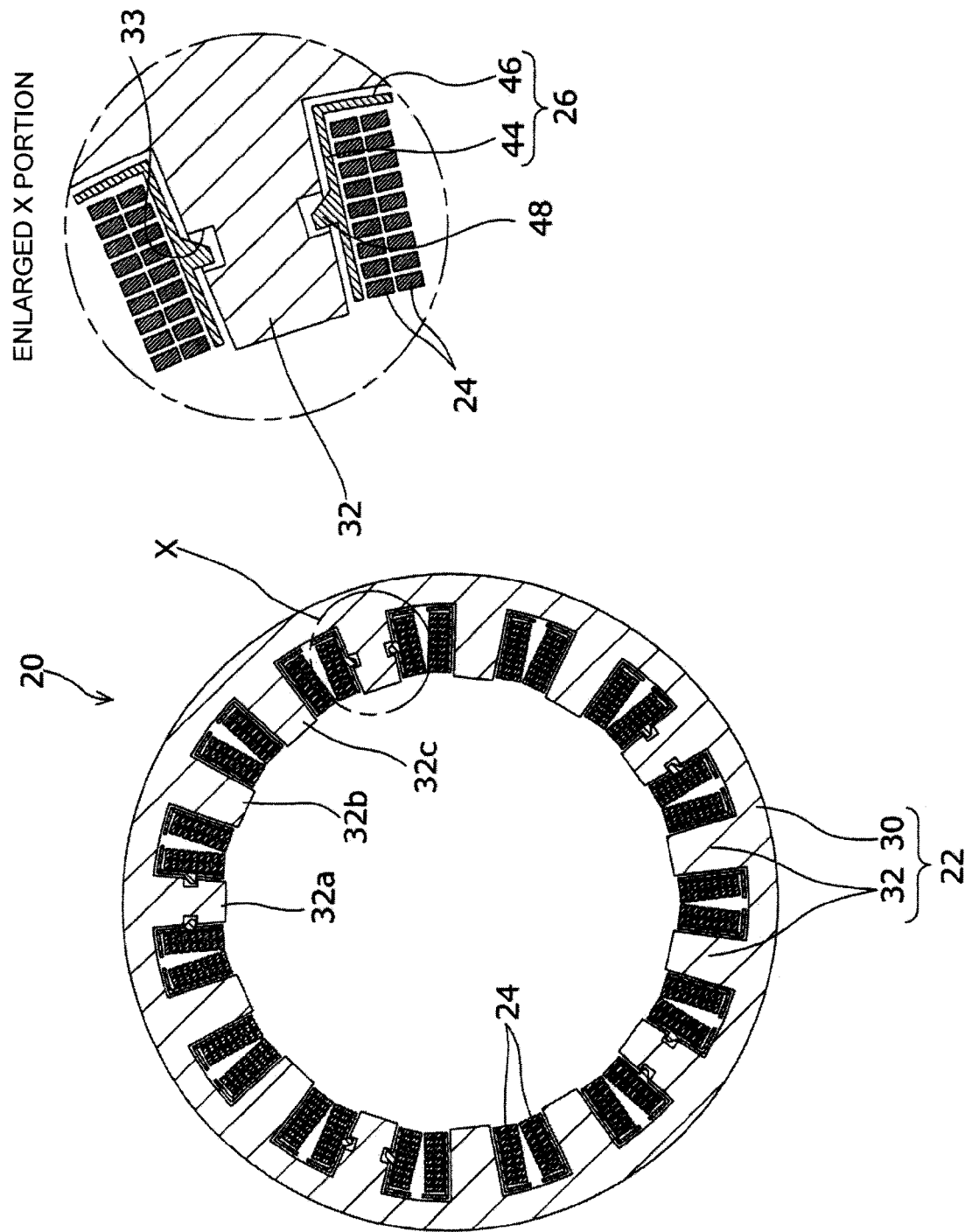
[Fig. 2]

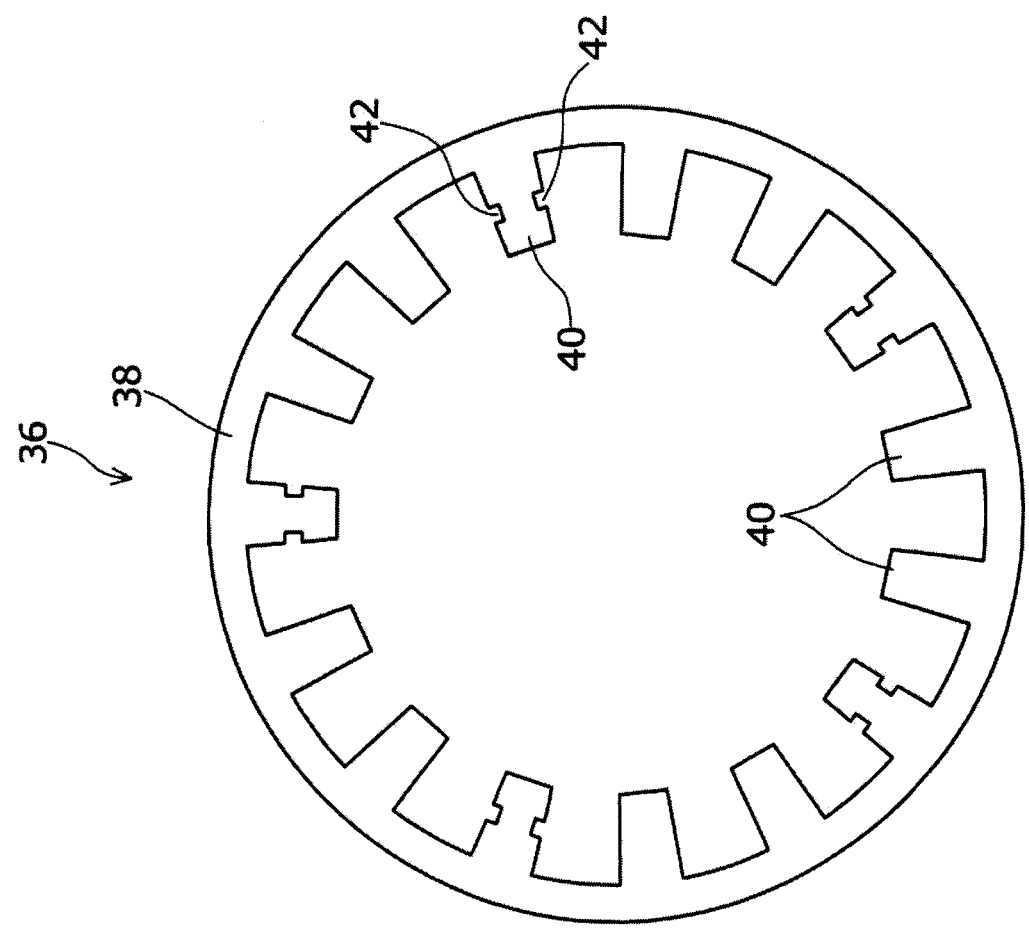
[Fig. 3]

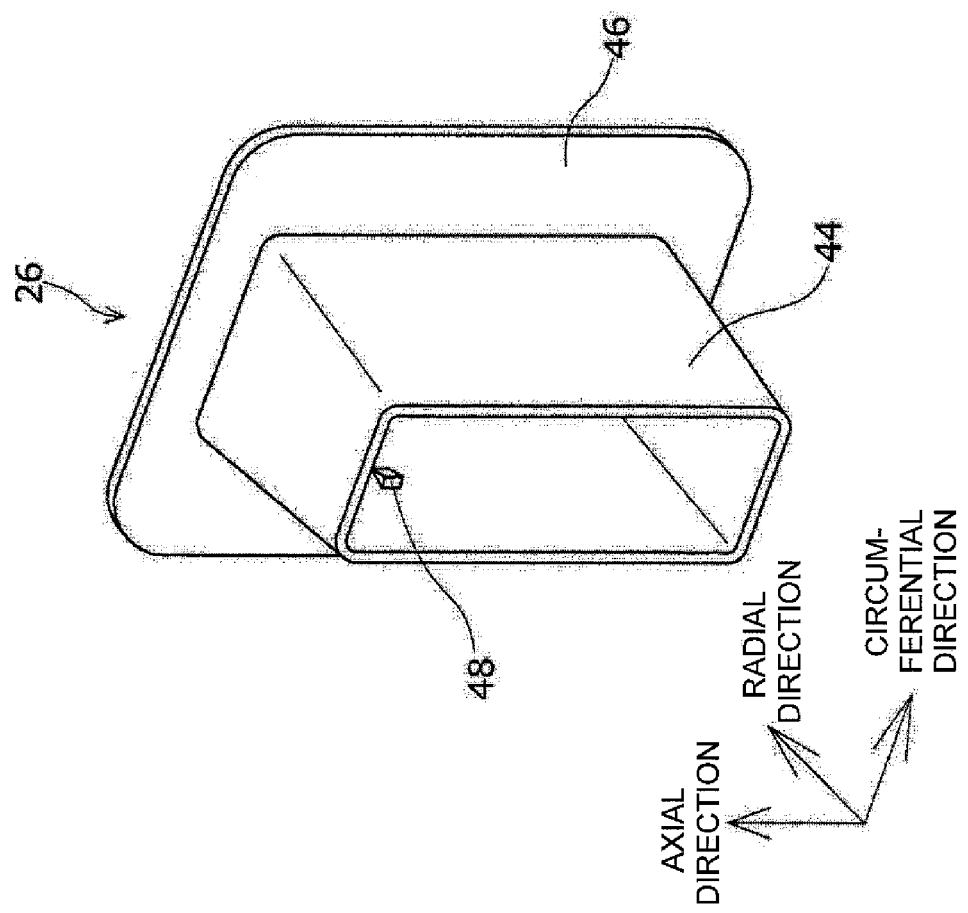

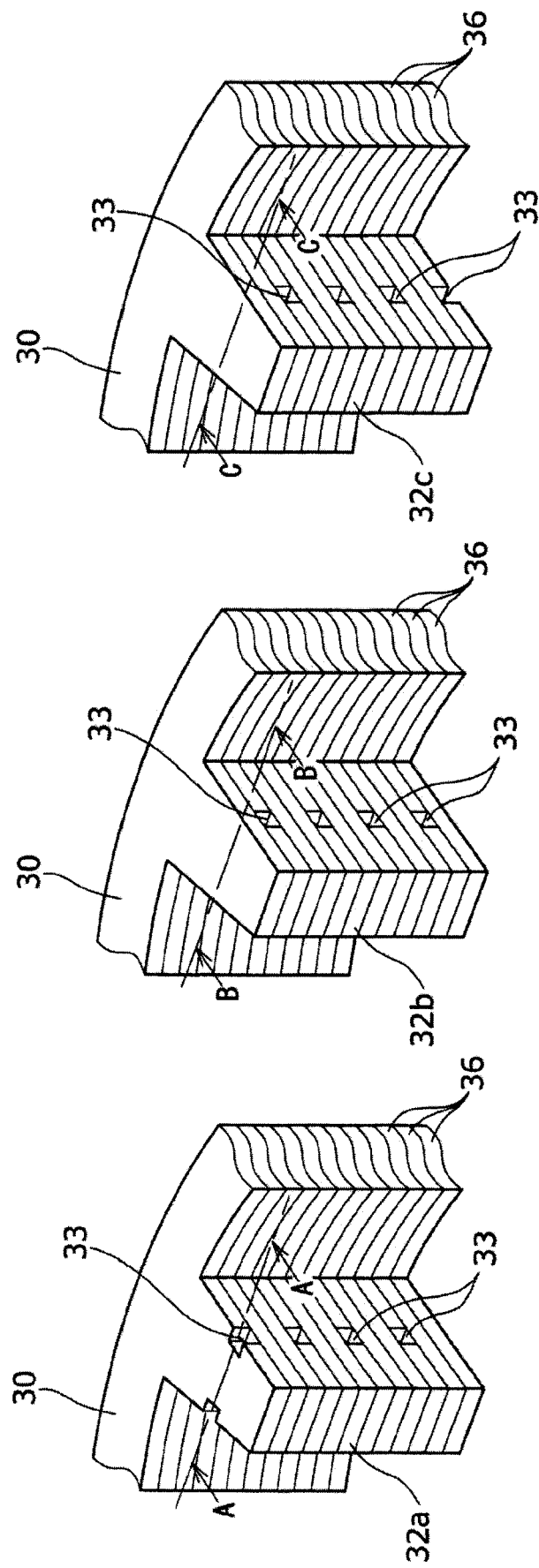

[Fig. 6]
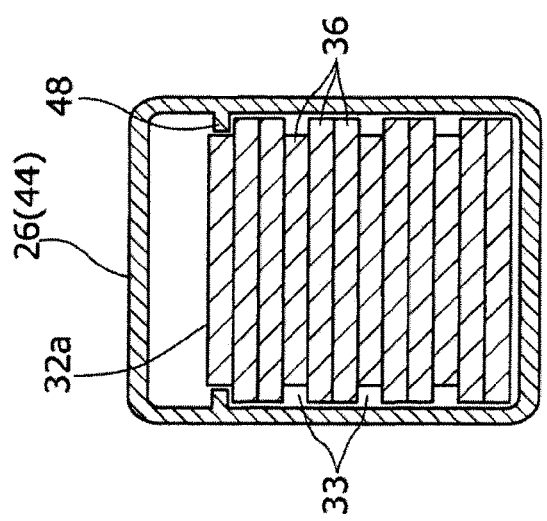
CROSS SECTION A-A
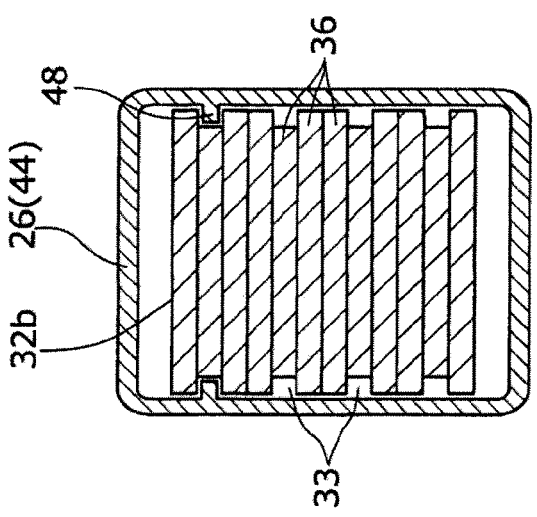
CROSS SECTION B-B
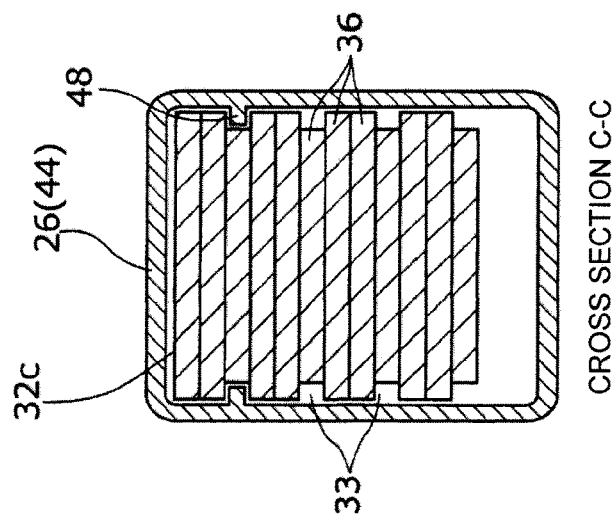
CROSS SECTION C-C

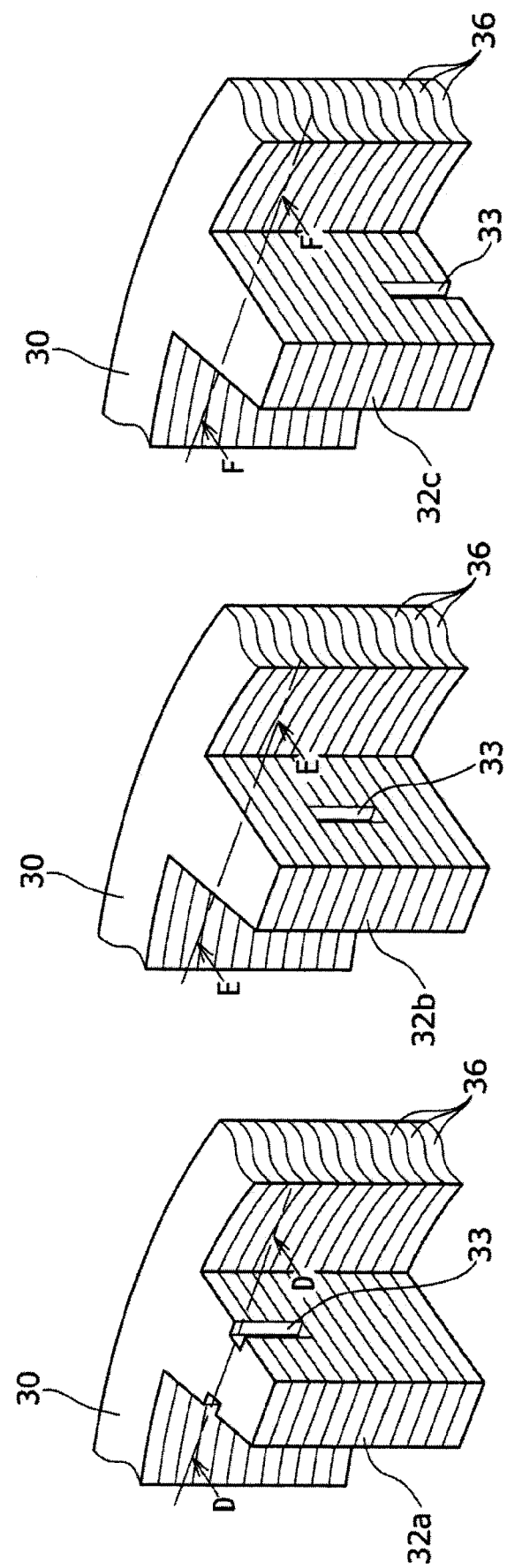
[Fig. 7]

[Fig. 8]
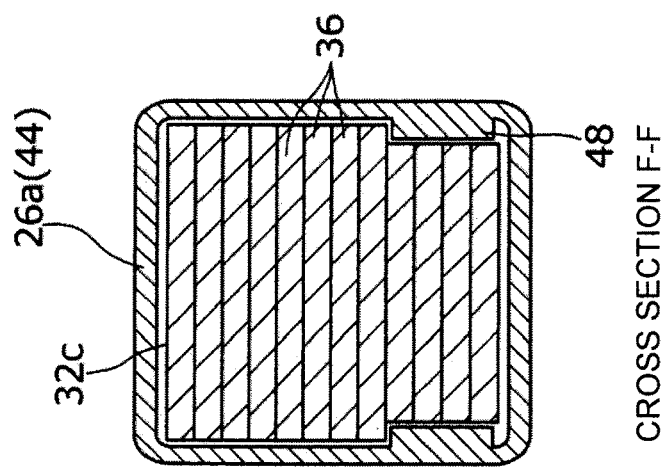
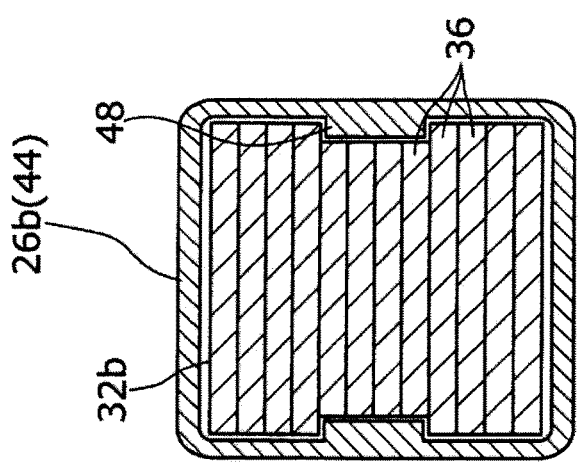
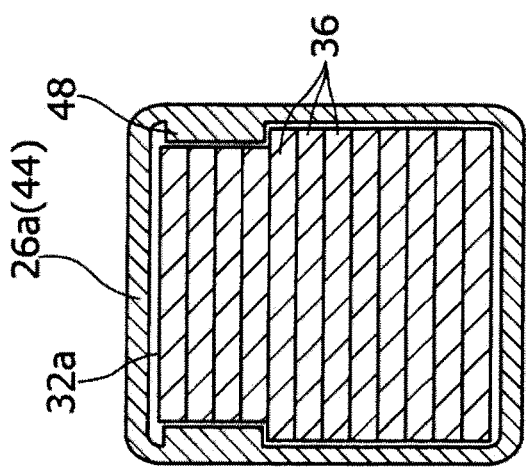

[Fig. 9]
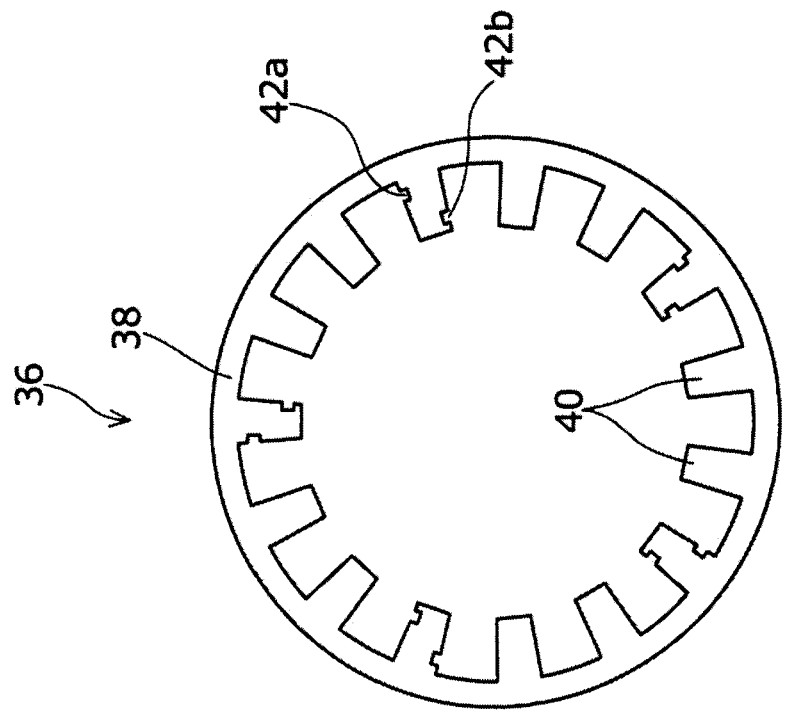
[Fig. 10]
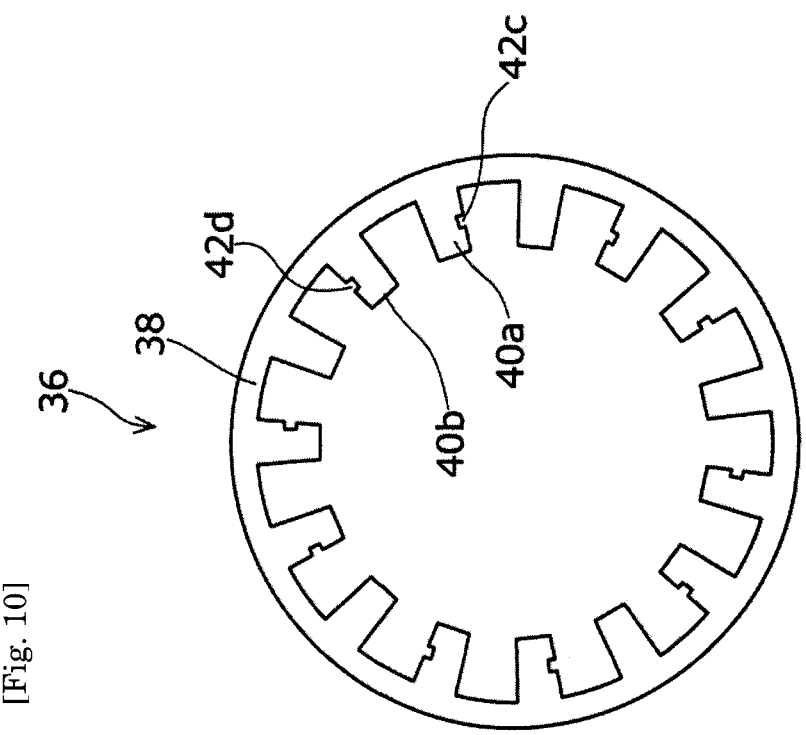

[Fig. 11]
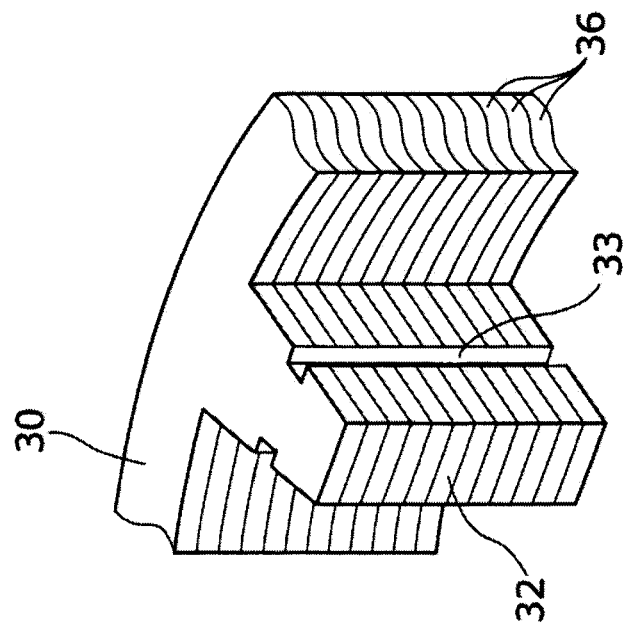
[Fig. 12]
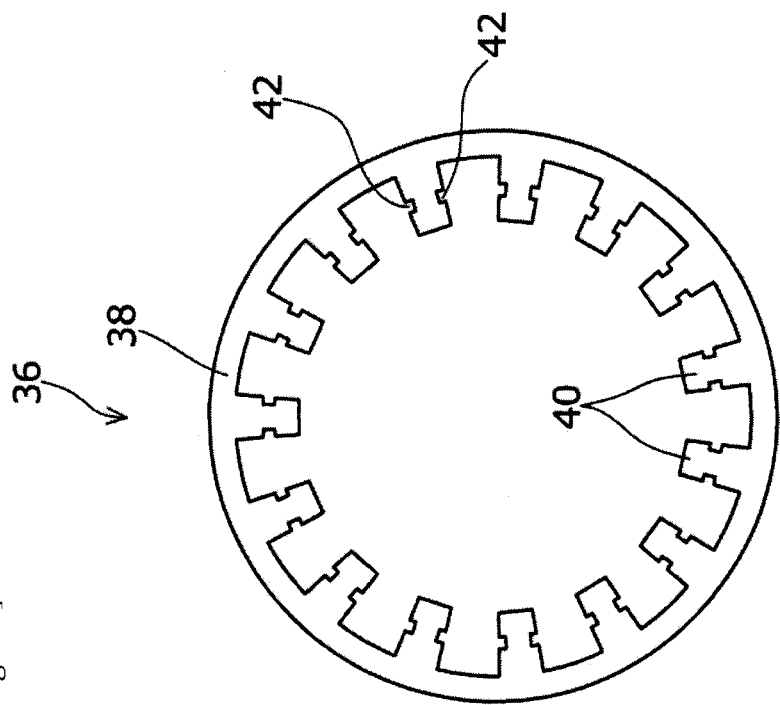

STATOR FOR ROTARY ELECTRIC MACHINE HAVING INSULATORS ENGAGED TO STATOR TEETH

CROSS REFERENCE TO RELATED APPLICATIONS

This application is a National Stage of International Application No. PCT/JP2015/004624, filed Sep. 10, 2015, claiming priority based on Japanese Patent Application No. 2014-218669, filed Oct. 27, 2014, the contents of all of which are incorporated herein by reference in their entirety.

TECHNICAL FIELD

The present invention relates to a stator for a rotary electric machine, the stator including a stator core formed by stacking a plurality of steel sheets, a stator coil wound around teeth of the stator core, and an insulator interposed between the stator core and the stator coil.

BACKGROUND ART

As known in the art, an insulator is disposed for insulation between a stator core and a stator coil of a rotary electric machine. The insulator is usually shaped into a substantially rectangular sleeve having a hole in which a tooth is received. The insulator is attached to the tooth by hooking engagement tabs formed on side surfaces of the insulator into engagement recesses formed in side surfaces of the tooth.

The stator core is a stack of a plurality of electromagnetic steel sheets, each electromagnetic steel sheet having notches for forming the engagement recesses. More specifically, each electromagnetic steel sheet has a plurality of tooth portions that form teeth when the electromagnetic steel sheets are stacked, each tooth portion having substantially rectangular notches on both sides of the tooth portion. By stacking such electromagnetic steel sheets, engagement recesses shaped in grooves extending throughout the stator in the axial direction are formed on both sides of each tooth.

CITATION LIST

Patent Literature

PTL 1: JP 3791492 B

SUMMARY OF INVENTION

Technical Problem

Conventional techniques as described above, however, require that notches be formed on all tooth portions of all electromagnetic steel sheets. This configuration tends to increase iron loss due to deformation occurring when the notches are press molded. Additionally, engagement recesses provided on both sides of each tooth partially narrow the width of the tooth and may cause magnetic saturation, to thereby decrease the output torque.

Patent Document 1 discloses a stator core formed by stacking a predetermined number of electromagnetic steel sheets each having a notch only on one side of each tooth portion and a predetermined number of electromagnetic steel sheets each having a notch only on another side of each tooth portion. In this stator core, the position of an engagement recess on one side of a tooth in the axial direction of the stator and the position of an engagement recess on another side of the tooth in the axial direction of the stator are shifted from each other. In other words, an engagement recess on one side of a tooth and an engagement recess on another side of the tooth are not located at the same position in the axial direction of the stator. As such, because the width of the tooth is nowhere narrowed by the combined widths of two engagement recesses, the generation of magnetic saturation is prevented to some extent.

However, the technique of Patent Document 1 requires two different types of electromagnetic steel sheets, and therefore requires two different types of press molds, resulting in increased costs. Further, the technique of Patent Document 1, in which notches are formed on all tooth portions, cannot address the problem of the increase in iron loss.

Solution to Problem

In consideration of the above, an object of the present invention is to provide a stator for a rotary electric machine, the stator being capable of preventing the increase in loss and the decrease in output torque, while avoiding an increase in the number of component types.

According to one aspect of the present invention, there is provided a stator for a rotary electric machine. The stator includes a stator core comprising a stack of a plurality of steel sheets; a stator coil wound around teeth of the stator core; and a plurality of insulators interposed between the stator core and the stator coil. Each of the insulators has at least one engagement tab projecting toward a side surface of a tooth when the insulator is attached to the tooth. Each of the steel sheets has a plurality of tooth portions that form the teeth when the plurality of steel sheets are stacked. Each of some of the plurality of tooth portions has a notch formed on a side surface of the tooth portion, the notches forming an engagement recess in which the engagement tab is hooked when the plurality of steel sheets are stacked. The stator core is formed by rotating and stacking the plurality of steel sheets.

In preferred embodiments, the stator core may be formed by rotating and stacking the plurality of steel sheets in units of a plurality of steel sheets.

In other preferred embodiments, each of the insulators may have an internal size in an axial direction of the stator, the internal size being greater than a length of the tooth in the axial direction of the stator, and each of the insulators may be located at a position in the axial direction of the stator with respect to a corresponding tooth, the position being changed in accordance with a position of the engagement recess in the corresponding tooth in the axial direction of the stator.

In other preferred embodiments, one or more of the insulators may be turned upside down in accordance with a position of the engagement recess in a corresponding tooth in the axial direction of the stator to change the position of the engagement tab in the axial direction of the stator.

In other preferred embodiments, the notches may be formed in one of every two or more of the tooth portions. In other preferred embodiments, the notches may be formed on both sides of a tooth portion. In other preferred embodiments, the notches may be all located at the same position in a radial direction of the stator.

Advantageous Effects of Invention

By employing the present invention, because steel sheets having notches only in some of tooth portions are rotated and stacked, the number of notches can be reduced, and the length of an engagement recess in the axial direction of the stator can be reduced. Further, steel sheets of only one type are used. Therefore, it is possible to prevent the increase in loss and the decrease in output torque, while avoiding an increase in number of component types.

BRIEF DESCRIPTION OF DRAWINGS

FIG. 1 is a schematic vertical cross-sectional view of a rotary electric machine according to an embodiment of the present invention.

FIG. 2 is a lateral cross-sectional view of a stator.

FIG. 3 is a plan view of an electromagnetic steel sheet.

FIG. 4 is a perspective view of an insulator.

FIG. 5 is a perspective view of three consecutive teeth.

FIG. 6 illustrates a cross section A-A, a cross section B-B, and a cross section C-C of the three consecutive teeth on each of which an insulator is attached.

FIG. 7 is a perspective view of three consecutive teeth according to a second embodiment.

FIG. 8 illustrates a cross section D-D, a cross section E-E, and a cross section F-F of the three consecutive teeth according to the second embodiment, on each of which an insulator is attached.

FIG. 9 illustrates an example of another electromagnetic steel sheet.

FIG. 10 illustrates an example of another electromagnetic steel sheet.

FIG. 11 is a perspective view of a conventional tooth.

FIG. 12 is a plan view of a conventional electromagnetic steel sheet.

DESCRIPTION OF EMBODIMENTS

Embodiments of the present invention will be described below with reference to the drawings. FIG. 1 is a schematic vertical cross-sectional view of a rotary electric machine 10 according to an embodiment of the present invention. FIG. 2 is a lateral cross-sectional view of a stator 20, and FIG. 3 is a plan view of an electromagnetic steel sheet 36 that forms part of a stator core 22. FIG. 4 is a schematic perspective view of an insulator 26 that is to be attached onto a tooth 32. For ease of understanding of the invention, sizes in the drawings differ from actual sizes and are partially inconsistent among the drawings. The size of an electromagnetic steel sheet 36 also significantly differs from the actual size; electromagnetic steel sheets 36 in an actual product are much thinner, and a greater number of them are stacked. The terms "axial direction," "radial direction," and "circumferential direction" used herein respectively represent the axial direction, the radial direction, and the circumferential direction of the stator 20.

According to the illustrated embodiment, the rotary electric machine 10 includes a rotor 12 and the stator 20. The rotor 12 includes a rotor core 14 and a plurality of permanent magnets 16 embedded in the rotor core 14. A rotating shaft 18 is placed through the center of the rotor core 14, and the rotating shaft 18 is supported by, for example, a bearings (not shown) to be rotatable with respect to a case (not shown). The rotor 12 is rotatable along with the rotating shaft 18.

The stator 20 is disposed outside of the rotor 12 to be concentric with the rotor 12. The stator 20 includes the stator core 22 having a substantially annular shape on the inner circumference of which a plurality of teeth 32 are formed, a stator coil 24 wound around the teeth 32, and the insulator 26 interposed between the stator core 22 and the stator coil 24. The stator core 22 is broadly composed of a yoke 30 having a substantially annular shape, and the teeth 32 projecting inward from the yoke 30. Each tooth 32 has a substantially trapezoidal cross section that gradually narrows toward the inside. Engagement recesses 33, in which engagement tabs 48 of the insulator 26 are to be hooked, are formed on both sides of the tooth 32 in the circumferential direction.

The stator core 22 is composed of a plurality of electromagnetic steel sheets 36 (for example, silicon steel sheets) stacked in the axial direction. Each electromagnetic steel sheet 36 is shaped to correspond to the stator core 22, or, in other words, shaped to have a yoke portion 38 having a substantially annular shape that forms the yoke 30 when the plurality of electromagnetic steel sheets 36 are stacked, and a plurality of tooth portions 40 that form the teeth 32 when the plurality of electromagnetic steel sheets 36 are stacked. The tooth portions 40 are equally spaced in the circumferential direction. Although the number of tooth portions 40 (or the number of teeth 32) is 15 in the illustrated embodiment, the number may be changed as desired. Some of the tooth portions 40 have notches 42 that form the engagement recesses 33 when the plurality of electromagnetic steel sheets 36 are stacked, which will be described in detail below.

The stator coil 24 of the illustrated embodiment is formed by a winding composed of a flat wire wound in a concentrated manner. The surface of the flat wire is enameled to insulate adjacent flat wires from each other. The stator coil 24 includes coils of three phases; that is, U-phase coils, V-phase coils, and W-phase coils, each phase coil being formed by a plurality of unit coils connected in series, each unit coil being formed by a winding wound around one tooth 32. The U-phase unit coils, V-phase unit coils, and W-phase unit coils are set around the plurality of teeth 32 sequentially and repeatedly in the circumferential direction. The above-described structure of the stator coil 24 is given as an example and may be changed as desired. For example, the stator coil 24 does not have to be wound in a concentrated manner but may be wound in a distributed manner, and the winding may be composed of a round wire rather than a flat wire.

The insulator 26 is disposed between the stator core 22 and the stator coil 24. The insulator 26 is a component composed of an insulating material, for example, a resin material such as a polyethylene terephthalate resin (PET resin). As shown in FIG. 4, the insulator 26 is broadly composed of a sleeve portion 44 shaped into a substantially rectangular sleeve, and a flange portion 46 projecting from an edge of the sleeve portion 44. The sleeve portion 44 has a shape corresponding to a tooth 32, and is shaped into a rectangular sleeve that is open on two sides opposing each other in the radial direction. However, the internal size of the sleeve portion 44 in the axial direction is slightly greater than the length of the tooth 32 in the axial direction (approximately by an amount corresponding to the thickness of two electromagnetic steel sheets 36). The reason for such a structure will be described in detail below.

The sleeve portion 44 is fitted on the tooth 32 from the inner side, and is disposed around the tooth 32. The engagement tabs 48 are formed on two of the sides that form the sleeve portion 44, the two sides (hereinafter referred to as "side surfaces") opposing each other in the circumferential direction. The engagement tabs 48 are projections projecting toward side surfaces of the tooth 32 when the insulator 26 is attached to the tooth 32. The shape, position, or number of the engagement tabs 48 may be determined in accordance with the shape, position, or number of the engagement recesses 33 provided in the tooth 32. In the illustrated embodiment, a total of two engagement tabs 48, one for each of the two side surfaces of the sleeve portion 44, are provided. The engagement tabs 48 are each formed near an end in the axial direction.

The flange portion 46 extends outward from the outer end of the sleeve portion 44. The flange portion 46 is located along the inner circumferential surface of the yoke 30 when the insulator 26 is attached to the tooth 32, and is interposed between the yoke 30 and the stator coil 24.

In the manufacturing of a stator 20, first, a plurality of electromagnetic steel sheets 36 are stacked to form a stator core 22, and then, with an insulator 26 being attached to each tooth 32 of the stator core 22, unit coils that are wound beforehand are fitted around the insulators 26 (or around the teeth 32). To fix the insulators 26 around the teeth 32 in this process, conventionally, engagement tabs 48 are formed on the insulators 26, and engagement recesses 33 are formed in the teeth 32 such that an engagement tab 48 is brought into engagement with an engagement recess 33. However, conventional techniques have some problems, because the engagement recesses 33 are formed throughout the axial direction. The problems of conventional techniques will be described below with reference to FIGS. 11 and 12.

FIG. 11 is a partial perspective view of a conventional stator core 22, and FIG. 12 is a plan view of an electromagnetic steel sheet 36 for forming the stator core 22. As shown in FIG. 11, the conventional stator core 22 also has engagement recesses 33 formed on both side surfaces of each tooth 32. However, in the conventional stator core 22, the engagement recesses 33 are formed throughout the axial direction. To form such engagement recesses 33, as shown in FIG. 12, the electromagnetic steel sheets 36 are shaped to have notches 42 formed on both sides of each tooth portion 40. However, these notches 42 may be deformed when press molded and may cause an increase in iron loss. The greater the number of such notches 42 that may be deformed, the greater the iron loss that may occur.

Further, in the conventional stator core 22, the engagement recesses 33 formed on both side surfaces of a tooth 32 are located at the same position in the radial direction. In this structure, the tooth 32 includes a narrow portion extending throughout the axial direction, the narrow portion having a smaller width than other portions. Such narrow portions may tend to cause magnetic saturation to decrease the output torque.

To avoid these drawbacks, in the illustrated embodiment, notches 42 are formed only in some of a plurality of tooth portions 40, and the electromagnetic steel sheets 36 are rotated one from another and stacked. More specifically, in the illustrated embodiment, as shown in FIG. 3, notches 42 are provided only in five of fifteen tooth portions 40. The notches 42 are formed in one of every three tooth portions 40 and are distributed evenly in the circumferential direction. A total of two notches 42, one for each of two sides of one tooth portion 40 in the circumferential direction, are provided. All notches 42 are located at the same position in the radial direction.

The stator 20 is formed by rotating the electromagnetic steel sheets 36 one from another and stacking them. The rotation phase is not particularly limited but may be any multiple of the phase at which the teeth 32 are spaced (in the illustrated embodiment, 360/15=24 degrees), except the phase at which the notches 42 are spaced (in the illustrated embodiment, 24×3=72 degrees). In the illustrated embodiment, the plurality of electromagnetic steel sheets 36 are rotated one from another by 120 degrees and stacked.

The shape of such a stator core 22 will be described below with reference to FIG. 5. FIG. 5 is a perspective view of three teeth 32 that are consecutive in the circumferential direction; that is, a first tooth 32a, a second tooth 32b, and a third tooth 32c (see FIG. 2).

In the illustrated embodiment, the electromagnetic steel sheets 36 having notches 42 formed in one of every three tooth portions 40 as described above are rotated one from another by 120 degrees and stacked. As a result, side surfaces of one tooth 32 have engagement recesses 33 formed by notches 42 that are formed in one of every three electromagnetic steel sheets 36.

The positions of the engagement recesses 33 in the axial direction in three consecutive teeth 32a, 32b, and 32c differ from each other. For example, for the first tooth 32a, side surfaces of the tooth 32 have engagement recesses 33 at positions corresponding to the first, fourth, seventh, and tenth electromagnetic steel sheets 36. Similarly, for the second tooth 32b, side surfaces of the tooth 32 have engagement recesses 33 at positions corresponding to the second, fifth, eighth, and eleventh electromagnetic steel sheets 36, and for the third tooth 32c, side surfaces of the tooth 32 have engagement recesses 33 at positions corresponding to the third, sixth, ninth, and twelfth electromagnetic steel sheets 36.

As can be clearly understood from the foregoing description, in the illustrated embodiment, the engagement recesses 33 are formed only partially in the axial direction on the side surfaces of the teeth 32. In other words, narrow portions that may tend to cause magnetic saturation are present only partially in the axial direction of the teeth 32. As a result, when compared with conventional techniques, the influence of magnetic saturation can be significantly reduced, and the decrease in output torque can be effectively prevented.

Additionally, in the illustrated embodiment, the notches 42 are formed only in some of the tooth portions 40. As a result, when compared with the structure in which notches 42 are formed in all tooth portions 40, the influence of deformation introduced during processing is small, and the iron loss can be reduced. Further, in the illustrated embodiment, the plurality of electromagnetic steel sheets 36 that form the stator core 22 all have the same shape. As a result, the number of component types is not increased, and only one type of press mold is used for obtaining the electromagnetic steel sheets 36; therefore, the increase in manufacturing costs can be prevented.

Next, a structure in which insulators 26 are attached to the stator 20 will be described with reference to FIG. 6. FIG. 6 illustrates a cross section A-A, a cross section B-B, and a cross section C-C of the first, second, and third teeth 32a, 32b, and 32c shown in FIG. 5, on each of which an insulator 26 is attached.

As described above, the engagement tabs 48 that hook in the engagement recesses 33 are provided on both side surfaces of an insulator 26 of the illustrated embodiment. The engagement tabs 48 have a shape and a size corresponding to those of an engagement recess 33. Each of the two side surfaces has one engagement tab 48; in other words, one insulator 26 has a total of two engagement tabs 48. The engagement tabs 48 are provided near upper ends of the side surfaces in the axial direction, or, more specifically, at positions away from the top by an amount corresponding to the thickness of two or three electromagnetic steel sheets 36.

During attachment of the insulators 26 to the teeth 32, the position of an insulator 26 in the axial direction is adjusted with respect to a corresponding tooth 32 such that the positions of the engagement tabs 48 and the uppermost engagement recesses 33 of the tooth 32 in the axial direction match with each other. By fitting the insulator 26 on the tooth 32 with the above-described state being maintained until the insulator 26 comes into contact with the bottom of the tooth 32, the engagement tabs 48 fit into and engage with the uppermost engagement recesses 33.

As described above, the positions of the engagement recesses 33 in the axial direction in the three consecutive teeth 32a, 32b, and 32c differ from each other. As such, the positions of the insulators 26 in the axial direction with respect to the three consecutive teeth 32a, 32b, and 32c should also differ from each other. Specifically, as shown in FIG. 6, the position of the insulator 26 in the axial direction with respect to the second tooth 32b is lower than the position of the insulator 26 in the axial direction with respect to the first tooth 32a by an amount corresponding to the thickness of one electromagnetic steel sheet 36. Similarly, the position of the insulator 26 in the axial direction with respect to the third tooth 32c is lower than the position of the insulator 26 in the axial direction with respect to the second tooth 32b by an amount corresponding to the thickness of one electromagnetic steel sheet 36. Such an arrangement allows the insulators 26 having exactly the same shape to be attached to three types of teeth 32a, 32b, and 32c whose engagement recesses 33 are located at different positions in the axial direction. As a result, the insulators 26 of only one type are sufficient, and the number of component types can be reduced.

In the illustrated embodiment, a gap is formed between an end surface of a tooth 32 in the axial direction and an end surface of an insulator 26 in the axial direction. However, because this gap is only of a size corresponding to the thickness of one to two electromagnetic steel sheets 36 (one electromagnetic steel sheet 36 has a thickness of about 0.2 mm to about 0.5 mm), the influence of the gap is negligible. Although, in FIG. 6, only one engagement tab 48 is provided on one side surface of the insulator 26, a greater number of engagement tabs 48, for example, the same number of engagement tabs 48 as the number of engagement recesses 33 formed on one side surface of the tooth 32, may be provided. However, a structure including a greater number of engagement tabs 48 requires close precision in size and high precision in machining. Therefore, it is preferred to provide a minimum number of engagement tabs 48 that provide an engagement force for attaching the insulators 26 to the teeth 32.

As can be clearly understood from the foregoing description, because the illustrated embodiment eliminates the need for more than one type of electromagnetic steel sheet 36 or more than one type of insulator 26, an increase in number of component types can be avoided. Further, because the notches 42 are formed only in some of the tooth portions 40, the iron loss can be reduced, and the decrease in output torque can be prevented.

Next, a second embodiment will be described with reference to FIGS. 7 and 8. FIG. 7 is a perspective view of three teeth 32a, 32b, and 32c that are consecutive in the circumferential direction, according to the second embodiment. FIG. 8 illustrates a cross section D-D, a cross section E-E, and a cross section F-F of the teeth 32a, 32b, and 32c shown in FIG. 7, on each of which an insulator 26 is attached.

In the illustrated embodiment, similarly as in the first embodiment, the electromagnetic steel sheets 36 illustrated in FIG. 3, or, in other words, the electromagnetic steel sheets 36 having notches 42 formed in one of every three tooth portions 40, are used as electromagnetic steel sheets 36. However, in the illustrated embodiment, a plurality of (in the illustrated example, three) groups of steel sheets, each group consisting of a plurality of (in the illustrated example, four) electromagnetic steel sheets 36 that are stacked without being rotated, are provided, and are stacked after one group of steel sheets is rotated from another group of steel sheets. As a result, four electromagnetic steel sheets 36 having notches 42 are consecutive in the axial direction in each tooth 32, and engagement recesses 33 having a length corresponding to the thickness of four electromagnetic steel sheets 36 are formed on side surfaces of each tooth 32. The positions of the engagement recesses 33 in the axial direction in the three teeth 32a, 32b, and 32c that are consecutive in the circumferential direction differ from each other. As can be seen from FIG. 8, the engagement recesses 33 in the first tooth 32a and the engagement recesses 33 in the third tooth 32c are in a vertically symmetric positional relationship with each other.

In the illustrated embodiment, the feature that the structures are vertically symmetric is taken advantage of, and a first insulator 26a is attached to each of the first and third teeth 32a and 32c. A second insulator 26b in which engagement tabs 48 are located at a position different from that in the first insulator 26a is attached to the second tooth 32b.

The first insulator 26a is an insulator in which engagement tabs 48 having a shape corresponding to that of the engagement recesses 33 are formed near one end of each of the side surfaces in the axial direction. To attach the first insulator 26a to the first tooth 32a, the first insulator 26a is held upright so that the engagement tabs 48 are located on the upper side. On the other hand, to attach the first insulator 26a to the third tooth 32c, the first insulator 26a is turned upside down and is held inverted so that the engagement tabs 48 are located on the lower side. By turning the first insulator 26a upside down in this manner as desired, one type of insulator 26a can be attached to two types of teeth 32a and 32c. As a result, the number of types of insulator 26 can be reduced.

The second insulator 26b is an insulator in which engagement tabs 48 having a shape corresponding to that of the engagement recesses 33 are formed substantially at the center of each of the side surfaces in the axial direction. The second insulator 26b is attached to the second tooth 32b. In other words, the illustrated embodiment allows use of two types of insulators 26a and 26b for three types of teeth 32a, 32b, and 32c.

As with the first embodiment, because the second embodiment also eliminates the need for more than one type of electromagnetic steel sheet 36, an increase in number of component types can be avoided. Further, because the notches 42 are formed only in some of the tooth portions 40, the iron loss can be reduced, and the decrease in output torque can be prevented.

Although, in the illustrated embodiment, two types of insulators 26a and 26b are used, similarly as in the first embodiment, one type of insulator 26 may be used with the position of the insulator 26 in the axial direction with respect to the tooth 32 being changed. Similarly, to attach the insulator 26 to the tooth 32 of the first embodiment, the insulator 26 may be turned upside down in accordance with the position of the engagement recesses 33 of the tooth 32 in the axial direction. Further, a plurality of insulators 26 having different shapes from each other may be provided in accordance with the position or shape of the engagement recesses 33 of the tooth 32.

The above-described structures are given by way of example. The notches 42 are formed only in some of the tooth portions 40 in the electromagnetic steel sheets 36, and the electromagnetic steel sheets 36 are stacked after being rotated either one from another or in units of a plurality of electromagnetic steel sheets 36; then the remaining features may be modified as desired. For example, although, in the illustrated embodiments, all notches 42 are located at the same position in the radial direction, the notches 42 may be located at different positions in the radial direction. For example, as shown in FIG. 9, the position of a notch 42a formed on a first side surface of one tooth portion 40 and the position of a notch 42b formed on a second side surface of the tooth portion 40 may differ from each other in the radial direction. Further, although, in the illustrated embodiments, notches 42 are provided on both side surfaces of one tooth portion 40, a notch 42 may be provided only on one side surface of one tooth portion 40. For example, as shown in FIG. 10, a notch 42c may be provided on a first side surface of one tooth portion 40a, and a notch 42d may be provided on a second side surface of another tooth portion 40b that is adjacent to the tooth portion 40a. Further, the structure illustrated in FIG. 10 may be modified by providing only the notch 42c on the first side surface without providing the notch 42d on the second side surface. In this case, engagement recesses 33 are formed only on the first side surface of each tooth 32, and no engagement recess 33 is formed on the second side surface that is opposite the first side surface.

Although, in the foregoing description, notches 42 are provided in one of every three tooth portions 40, notches 42 may be provided in some of a plurality of tooth portions 40 at other intervals. For example, notches 42 may be provided either in one of every two tooth portions 40 or in one of every five tooth portions 40. Further, notches 42 do not have to be equally spaced. A notch 42 may be provided only in one of a plurality of tooth portions 40, or, on the other hand, notches 42 may be provided in all tooth portions 40 except one tooth portion 40. In any case, at least one tooth portion 40 has no notch 42.

REFERENCE SIGNS LIST

10 ROTARY ELECTRIC MACHINE
12 ROTOR
14 ROTOR CORE
16 PERMANENT MAGNET
18 ROTATING SHAFT
20 STATOR
22 STATOR CORE
24 STATOR COIL
26 INSULATOR
30 YOKE
32 TOOTH
33 ENGAGEMENT RECESS
36 ELECTROMAGNETIC STEEL SHEET
38 YOKE PORTION
40 TOOTH PORTION
42 NOTCH
44 SLEEVE PORTION
46 FLANGE PORTION
48 ENGAGEMENT TAB

The invention claimed is:

1. A stator for a rotary electric machine, the stator comprising:
    a stator core comprising a stack of a plurality of annular steel sheets;
    a stator coil wound around teeth of the stator core; and
    a plurality of insulators interposed between the stator core and the stator coil, wherein
    each of the insulators has at least one engagement tab projecting toward a circumferential-direction side surface of a tooth when the insulator is attached to the tooth, the engagement tab extending only partially in the axial direction of the tooth,
    an engagement recess configured to hook the engagement tab therein is formed in the circumferential-direction side surface of each of the teeth,
    each of the annular steel sheets has one or more first tooth portions and one or more second tooth portions,
    the one or more first tooth portions form the teeth when the plurality of steel sheets are stacked, wherein a notch is formed on a circumferential-direction side surface of each of the first tooth portions, and the notches of the one or more first tooth portions form the engagement recess in which the engagement tab is hooked when the plurality of steel sheets are stacked,
    the one or more second tooth portions that form the teeth when the plurality of steel sheets are stacked, the notch is not formed in the one or more second tooth portions, and the one or more second tooth portions are separated from the one or more first tooth portions in a circumferential direction with one or more slots therebetween,
    the plurality of annular steel sheets are rotated either one from another or in units of a plurality of steel sheets and stacked, and
    the engagement tab and the engagement recess correspond to each other in shape, position, and number.

2. The stator for a rotary electric machine according to claim 1, wherein the stator core is formed by rotating and stacking the plurality of steel sheets in units of a plurality of steel sheets.

3. The stator for a rotary electric machine according to claim 1, wherein
    each of the insulators has an internal size in an axial direction of the stator, the internal size being greater than a length of the tooth in the axial direction of the stator, and
    each of the insulators is located at a position in the axial direction of the stator with respect to a corresponding tooth, the position being changed in accordance with a position of the engagement recess in the corresponding tooth in the axial direction of the stator.

4. The stator for a rotary electric machine according to claim 1, wherein
    one or more of the insulators are turned upside down in accordance with a position of the engagement recess in a corresponding tooth in the axial direction of the stator to change the position of the engagement tab in the axial direction of the stator.

5. The stator for a rotary electric machine according to claim 1, wherein
    the notches are formed in one of every two or more of the tooth portions.

6. The stator for a rotary electric machine according to claim 1, wherein the notches are formed on both sides of each of the first tooth portions.

7. The stator for a rotary electric machine according to claim 1, wherein
    the notches are all located at the same position in a radial direction of the stator.

* * * * *